United States Patent
Kumar et al.

(10) Patent No.: US 12,463,891 B2
(45) Date of Patent: Nov. 4, 2025

(54) METHODS AND SYSTEMS TO PRIORITIZE BORDER GATE PROTOCOL (BGP) ROUTE TARGET (RT) MEMBERSHIP NETWORK LAYER REACHABILITY INFORMATION (NLRI) HANDLING

(71) Applicant: Telefonaktiebolaget LM Ericsson (publ), Stockholm (SE)

(72) Inventors: M Praveen Kumar, Bangalore (IN); Tulasi Rami Reddy N, Bangalore (IN)

(73) Assignee: Telefonaktiebolaget LM Ericsson (publ), Santa Clara, CA (US)

(*) Notice: Subject to any disclaimer, the term of this patent is extended or adjusted under 35 U.S.C. 154(b) by 57 days.

(21) Appl. No.: 18/618,339

(22) Filed: Mar. 27, 2024

(65) Prior Publication Data
US 2025/0310236 A1    Oct. 2, 2025

(51) Int. Cl.
*H04L 45/02* (2022.01)
*H04L 45/028* (2022.01)
(Continued)

(52) U.S. Cl.
CPC ........... *H04L 45/04* (2013.01); *H04L 45/028* (2013.01); *H04L 45/42* (2013.01); *H04L 45/586* (2013.01)

(58) Field of Classification Search
CPC ....... H04L 45/04; H04L 45/42; H04L 45/586; H04L 45/028
See application file for complete search history.

(56) References Cited

U.S. PATENT DOCUMENTS

2013/0201909 A1* 8/2013 Bosch ............... H04L 45/02
                                                             370/328
2016/0352619 A1* 12/2016 Gattani ............ H04L 41/0813

FOREIGN PATENT DOCUMENTS

CN    107948066 B  * 11/2020 ............ H04L 45/14
EP    3488568 B1   * 10/2020 ........... H04L 45/745

OTHER PUBLICATIONS

Sajassi, et al., "BGP MPLS-Based Ethernet VPN", Internet Engineering Task Force (IETF), Request for Comments: 7432, Feb. 2015, pp. 1-56.

(Continued)

*Primary Examiner* — Glenton B Burgess
*Assistant Examiner* — Jihad K Boustany
(74) *Attorney, Agent, or Firm* — NICHOLSON DE VOS WEBSTER & ELLIOTT LLP

(57) ABSTRACT

Embodiments include methods, electronic device, storage medium to prioritize Ethernet Segment (ES) route handling. In one embodiment, a method comprises, upon receiving a BGP update message with a route target (RT) membership Network Layer Reachability Information (NLRI), determining whether to prioritize the BGP update message based on existence of a flag indication within the RT membership NLRI; responsive to the flag indication being set in the RT membership NLRI, processing the RT membership NLRI to advertise a route matching the RT membership indicated in the first BGP update message without waiting on one or more periodic update timers; responsive to the flag indication not being set but the RT membership NLRI including a combination of type and subtype that indicates an ES-import RT, processing the RT membership NLRI without waiting on the timers as well; and otherwise processing the RT membership NLRI to advertise upon expiration of the timers.

20 Claims, 8 Drawing Sheets

(51) Int. Cl.
   *H04L 45/42*      (2022.01)
   *H04L 45/586*     (2022.01)

(56)          References Cited

OTHER PUBLICATIONS

Marques, et al., "Constrained Route Distribution for Border Gateway Protocol/MultiProtocol Label Switching (BGP/MPLS) Internet Protocol (IP) Virtual Private Networks (VPNs)", Network Working Group, Request for Comments: 4684, Nov. 2006, pp. 1-14.
Scudder, et al., "Capabilities Advertisement with BGP-4", Network Working Group, Request for Comments: 5492, Feb. 2009, pp. 1-7.
Rabadan, et al., "Preference-based EVPN DF Election", BESS Workgroup, Internet Draft: draft-ietf-bess-evpn-pref-df-13, Oct. 9, 2023, 19 pages.
Rabadan, et al., "Framework for Ethernet VPN Designated Forwarder Election Extensibility", Internet Engineering Task Force (IETF), Request for Comments: 8584, Apr. 2019, pp. 1-32.
Rekhter, et al., "A Border Gateway Protocol 4 (BGP-4)", Network Working Group, Request for Comments: 4271, Jan. 2006, pp. 1-104.

\* cited by examiner

400

Upon receiving a first border gateway protocol (BGP) update message with a route target (RT) membership Network Layer Reachability Information (NLRI) that indicates a route target (RT) membership (e.g., one corresponding to an ESI or L3VPN), determine whether to prioritize the first BGP update message based on existence of a flag indication within the RT membership NLRI. 402

Responsive to the existence of the flag indication and the flag indication being set in the RT membership NLRI, process the RT membership NLRI to advertise a route matching the RT membership indicated in the first BGP update message without waiting on one or more periodic update timers for route update and advertisement. 404

Responsive to the existence of the flag indication and the flag indication not being set but the RT membership NLRI including a combination of type and subtype that indicates an ES-import RT, process the RT membership NLRI to advertise the route matching the RT membership indicated in the first BGP update message without waiting on the one or more periodic update timers. 406

Otherwise process the RT membership NLRI to advertise the route upon expiration of the one or more periodic update timers. 408

Upon detecting activation of an Ethernet segment (ES) at a first network device, generating a border gateway protocol (BGP) update message to include a route target (RT) membership Network Layer Reachability Information (NLRI) that indicates a RT membership. 502 responsive to a successful negotiation between the first network device and a second network device to support of a flag indication to prioritize the BGP update message at the second network device, set the flag indication within the RT membership NLRI. 504

Set a combination of type and subtype that indicates an ES-import RT within the RT membership NLRI. 506

Transmit the BGP update message including the RT membership NLRI from the first network device to one or more receiving network devices in the network including the second network device. 508

FIG. 5

METHODS AND SYSTEMS TO PRIORITIZE BORDER GATE PROTOCOL (BGP) ROUTE TARGET (RT) MEMBERSHIP NETWORK LAYER REACHABILITY INFORMATION (NLRI) HANDLING

TECHNICAL FIELD

Embodiments of the invention relate to the field of networking; and more specifically, to prioritize Border Gate Protocol (BGP) route target (RT) membership Network Layer Reachability Information (NLRI).

BACKGROUND ART

A designated forwarder (DF) in a Border Gate Protocol (BGP) Ethernet virtual private network (EVPNs) is a provider edge (PE) device responsible for sending Broadcast, Unknown Unicast, and Multicast (BUM) traffic to a multihomed customer edge (CE) device on a given virtual local area network (VLAN) of a particular Ethernet segment (ES). The DF is elected from the set of multihomed PEs attached to a given ES, each of which advertises an ES route for the Ethernet segment identified by its Ethernet Segment Identifier (ESI). The selection of the DF has been discussed in standards such as Request For Comments (RFC) 7432 of the Internet Engineering Task Force (IETF), entitled "BGP MPLS-Based Ethernet VPN" (e.g., Section 8.5) and dated February 2015. IETF RFC 8584, entitled "Framework for Ethernet VPN Designated Forwarder Election Extensibility" and dated April 2019, updates the earlier DF election by providing a new DF election algorithm, highest random weight (HRW).

Yet the proper DF election using any of the proposed methods depends on the availability of candidate list of PEs advertising the ES Routes for a given ES. If there is deficiency in the list, then stable and uniform DF results may not be achievable. To obtain the correct candidate list of PEs, a BGP node processes ES routes advertised by other BGP nodes of the ES within an EVPN. Yet the other BGP nodes handle the ES route advertisement along with other BGP update messages, and the handling of the ES route advertisement by the other BGP nodes may be delayed when the other BGP update messages are in need of processing as well. Consequently, the ES advertised routes may not be received in time by a DF calculating PE, which then elects the DF based on an incomplete candidate list of PEs, and the incomplete candidate list resulting in an improper DF election.

SUMMARY OF THE INVENTION

Embodiments include methods, network device, storage medium, and computer program to prioritize route target (RT) membership Network Layer Reachability Information (NLRI) in a network implementing Border Gate Protocol (BGP). In one embodiment, a method is to be implemented by a network device to operate as a border gateway protocol (BGP) node, and the method comprising: upon receiving a first border gateway protocol (BGP) update message with a route target (RT) membership Network Layer Reachability Information (NLRI) that indicates a route target (RT) membership, determining whether to prioritize the first BGP update message based on existence of a flag indication within the RT membership NLRI; responsive to the existence of the flag indication and the flag indication being set in the RT membership NLRI, processing the RT membership NLRI to advertise a route matching the RT membership indicated in the first BGP update message without waiting on one or more periodic update timers for route update and advertisement; responsive to the existence of the flag indication and the flag indication not being set but the RT membership NLRI including a combination of type and subtype that indicates an ES-import RT, processing the RT membership NLRI to advertise the route matching the RT membership indicated in the first BGP update message without waiting on the one or more periodic update timers; and otherwise processing the RT membership NLRI to advertise upon expiration of the one or more periodic update timers.

Embodiments include network devices to prioritize route target (RT) membership Network Layer Reachability Information (NLRI) in a network implementing Border Gate Protocol (BGP). In one embodiment, a network device is to operate as a border gateway protocol (BGP) node, comprising a processor and non-transitory machine-readable storage medium that provides instructions that, when executed by the processor, are capable of causing the processor to perform: upon receiving a first border gateway protocol (BGP) update message with a route target (RT) membership Network Layer Reachability Information (NLRI) that indicates a route target (RT) membership, determining whether to prioritize the first BGP update message based on existence of a flag indication within the RT membership NLRI; responsive to the existence of the flag indication and the flag indication being set in the RT membership NLRI, processing the RT membership NLRI to advertise a route matching the RT membership indicated in the first BGP update message without waiting on one or more periodic update timers for route update and advertisement; responsive to the existence of the flag indication and the flag indication not being set but the RT membership NLRI including a combination of type and subtype that indicates an ES-import RT, processing the RT membership NLRI to advertise the route matching the RT membership indicated in the first BGP update message without waiting on the one or more periodic update timers; and otherwise processing the RT membership NLRI to advertise upon expiration of the one or more periodic update timers.

Embodiments include machine-readable storage media that provide instructions that, when executed by a processor, are capable of causing the processor to perform operations to prioritize route target (RT) membership Network Layer Reachability Information (NLRI). In one embodiment, a machine-readable storage medium provides instructions that, when executed by a processor, are capable of causing the processor to perform: upon receiving a first border gateway protocol (BGP) update message with a route target (RT) membership Network Layer Reachability Information (NLRI) that indicates a route target (RT) membership, determining whether to prioritize the first BGP update message based on existence of a flag indication within the RT membership NLRI; responsive to the existence of the flag indication and the flag indication being set in the RT membership NLRI, processing the RT membership NLRI to advertise a route matching the RT membership indicated in the first BGP update message without waiting on one or more periodic update timers for route update and advertisement; responsive to the existence of the flag indication and the flag indication not being set but the RT membership NLRI including a combination of type and subtype that indicates an ES-import RT, processing the RT membership NLRI to advertise the route matching the RT membership indicated in the first BGP update message without waiting on the one or more periodic update timers; and otherwise processing the RT membership NLRI to advertise upon expiration of the one or more periodic update timers.

Through these embodiments, route target (RT) membership Network Layer Reachability Information (NLRI) processing is prioritized. Such prioritization provides expeditious dedicated forwarder (DF) election results during ES activation/restoration, improves convergence time, and/or reduces the possibility of duplicated DFs.

BRIEF DESCRIPTION OF THE DRAWINGS

The invention may best be understood by referring to the following description and accompanying drawings that are used to illustrate embodiments of the invention. In the drawings:

FIG. 4 illustrates the operations of prioritizing route target (RT) membership handling at a network device that receives a BGP update message per some embodiments.

FIG. 5 illustrates the operations of prioritizing route target (RT) membership handling at a network device that transmits a BGP update message per some embodiments.

DETAILED DESCRIPTION

Figure 1A:
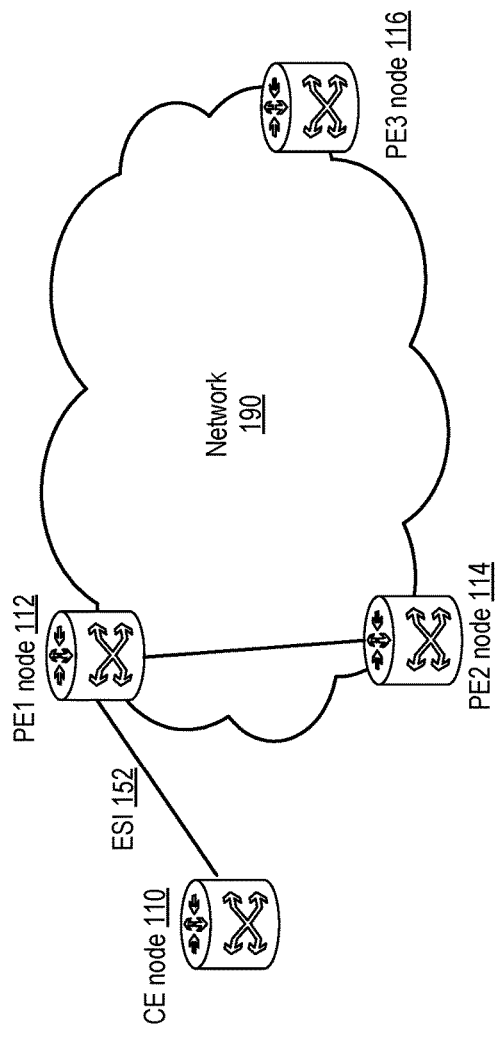
FIGS. 1A-B illustrate prioritized Ethernet Segment (ES) route handling per some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Bracketed text and blocks with dashed borders (such as large dashes, small dashes, dot-dash, and dots) may be used to illustrate optional operations that add additional features to the embodiments of the disclosure. Such notation, however, should not be taken to mean that these are the only options or optional operations, and/or that blocks with solid borders are not optional in some embodiments of the disclosure.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "connected" means a direct electrical or magnetic connection between the things that are connected, without any intermediary devices, while the term of "coupled" means either a direct electrical or magnetic connection between the things that are connected or an indirect connection through one or more passive or active intermediary devices. The term "circuit" means one or more passive and/or active components that are arranged to cooperate with one another to provide a desired function in an electronic device. The term "set" means any positive whole number of items including one item.

Border Gateway Protocol (BGP) Messages and Ethernet Segment (ES) Route

The Border Gateway Protocol (BGP) is an inter-Autonomous System (AS) routing protocol. The primary function of a BGP node is to exchange network reachability information with other peer BGP nodes. Virtual Private Network (VPN) allows users to create a secure connection over a less secure network, and BGP may be used in conjunction with Multiprotocol Label Switching (MPLS), Segment Routing IPv6 (SRv6), or another protocol to create VPNs within a service provider network.

BGP may be used to exchange routing information between different VPNs or between a VPN and an external network. Note that a BGP node is also referred to as a BGP speaker, a BGP speaking system (or BGP system), a BGP router/route reflector/route server, or a similar term; and another BGP node that communicates with the BGP node is referred to as a peer BGP node/speaker/system (or a peer BGP), a neighbor/neighboring BGP node, a BGP partner, or a similar term.

A variety of BGP messages are defined for BGP messages exchanged between BGP nodes in a network. For example, IETF RFC 4271, entitled "A Border Gateway Protocol 4 (BGP-4)" and dated January 2006 defines (1) OPEN, which is sent by a BGP node to initiate a BGP session and includes information about the sender's BGP capabilities and parameters; (2) UPDATE, which is used to advertise routing information (prefixes) to BGP neighbors; (3) NOTIFICATION, which is used to report errors and terminate the BGP session when a problem occurs, and it contains a Code field and a Subcode field to indicate the type and specific nature of the error; (4) KEEPALIVE, which is used to maintain a BGP session and ensure that the connection between peer BGP nodes is still alive, and it is sent periodically as a form of "heartbeat" to keep the session active; and (5) ROUTE-REFRESH, which is used to request the re-advertisement of BGP routes, and is typically used when there is a change in the BGP policy and one refers to refresh the routes without tearing down the BGP session. The BGP messages of open, update, notification, keepalive, and route-refresh are described herein to denote that these messages may perform the functionalities described in IETF RFC 4271 but not limited to the specifics defined in the standard, e.g., the BGP messages of open, update, notification, keepalive, and route-refresh may be implemented in a network with proprietary extension to BGP.

A BGP update message can advertise a set of path attributes that apply to one or more destinations carried in the field of network layer reachability information (NLRI) of the BGP update message. A BGP update message may include various base path attributes, including weight, origin, and AS path and it may advertise routes that are to be added or withdrawn from service. Note that the terms of NLRI, NLRI/prefix, and NLRI prefix are used interchangeably herein. NLRI is used to describe routing information carried through BGP update messages without any semantics of the NLRI.

VPN services are often implemented in a service provider's network, which include Provider Edges (PEs) located at the edge of the network. PEs are responsible for connecting customer edges (CEs) to the provider network and implementing VPN services. PEs typically maintain VPN routing and forwarding information for multiple customers and are capable of applying VPN-specific policies and configurations. CEs are typically routers, switches, or other network nodes owned and managed by a customer. CEs are responsible for exchanging routing information with the PEs, participating in VPN services, and forwarding traffic to and from the provider network.

When the links to one or more PEs from a CE are a set of Ethernet links, these links form an Ethernet Segment (ES). An ES route is a route used in Ethernet Virtual Private Networks (EVPNs) to advertise information about Layer 2 Ethernet segments across a network. These routes are distributed among the EVPN devices using BGP (Border Gateway Protocol). An ES route contains the following information: (1) route type (specifying that the route is an ES route), (2) Ethernet Segment Identifier (ESI) (identifying the Ethernet segment to which the route corresponds, note that the ESI is a unique identifier associated with each Ethernet segment and is used to distinguish between different segments), and other fields. Ethernet Segment routes are exchanged between multi-homed EVPN devices, such as Provider Edge (PE) nodes to ensure that all devices in the network have visibility into the available Ethernet segments and their associated attributes. This allows for the establishment of Layer 2 connectivity across the network and enables services such as virtual private LAN services (VPLS) and data center interconnect (DCI) over an IP/MPLS or SRv6 network infrastructure.

Prioritized Ethernet Segment Route

Figure 1B:
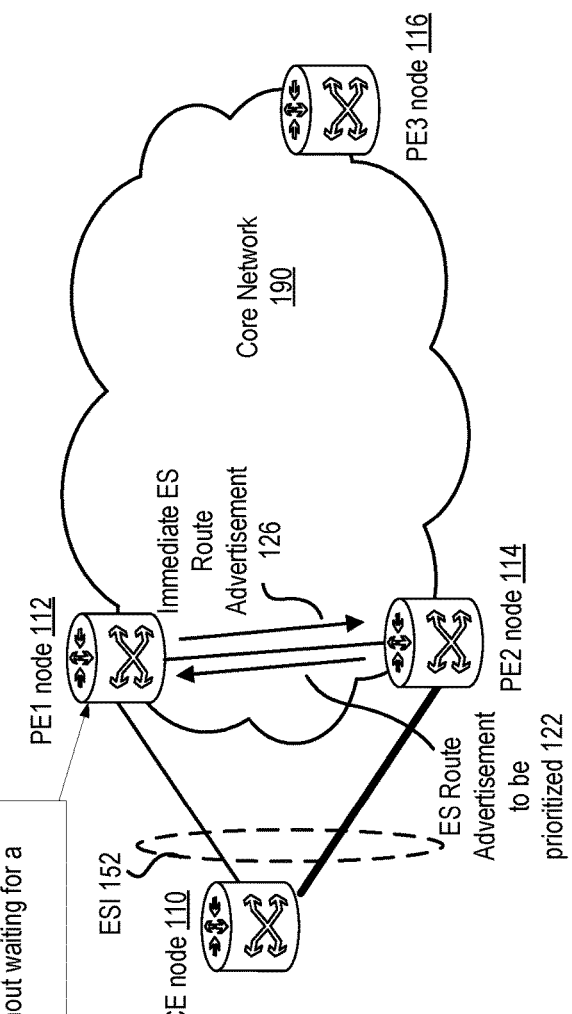

FIGS. 1A-B illustrate prioritized Ethernet Segment (ES) route handling per some embodiments. FIG. 1A illustrates a VPN network 190 with one CE node 110 and three PE nodes, PE1 to PE3 nodes 112 to 116. Each of the PE/CE nodes supports BGP. VPN network 190 may be a core network or a local area network. Initially, only PE1 node 112 belongs to Ethernet Segment Identifier (ESI) group ESI 1, as shown at reference 152, where ESI 1 corresponds to the link between CE node 110 and PE1 node 112.

Later, another link between CE node 110 and PE2 node 114 becomes active, either through service restoration or new service activation, and the newly active link, designated with a heavier line, also belongs to ESI 1. FIG. 1B illustrates the prioritization of ES route learning upon the activation of the new link to ESI 1. PE2 node 114 requests ES routes by advertising route target (RT) membership NLRI, based on IETF RFC 4684, entitled "Constrained Route Distribution for Border Gateway Protocol/MultiProtocol Label Switching (BGP/MPLS) Internet Protocol (IP) Virtual Private Networks (VPNs)" and dated November 2006.

A route target is a BGP attribute used to control the distribution and import/export of routes between different VPNs (Virtual Private Networks) within a provider's network. RTs ensure proper VPN isolation and control the exchange of routing information between VPNs. RTs are typically expressed as 8-byte values and are associated with VPN routes to indicate which VPNs the routes belong to, and which VPNs should import or export those routes. They serve as a way to distinguish routes belonging to different VPNs and ensure that routes are distributed only to the appropriate VPNs.

A RT membership NLRI is used to distribute information about which VPNs are associated with a particular route target. The BGP update messages including the RT membership NLRI are exchanged between BGP nodes in the provider's network to maintain proper VPN routing and forwarding.

In FIG. 1B, PE2 node 114 transmits BGP update messages for ES route advertisement to be prioritized at reference 122. The BGP update messages advertise the RT membership NLRI corresponds to ES-Import route target of ESI 1. According to RFC 7432, PE2 node 114 then starts a timer (default value=3 seconds) to allow the reception of Ethernet Segment routes from other PE nodes connected to the same Ethernet segment. This timer value should be the same across all PE nodes connected to the same Ethernet segment. The expectation is that within the timer period, PE2 node 114 will receive the corresponding ES routes from all PE nodes connected to ESI 1. Based on the received ES routes, PE2 node 114 may then elect a designated forwarder (DF) for sending Broadcast, Unknown Unicast, and Multicast (BUM) traffic to CE1 node 110, a multihomed CE.

Yet the other PE nodes such as PE1 node 112 may receive and need to process multiple BGP messages along with the BGP update message advertising the RT membership NLRI corresponds to ES-Import route target of ESI 1. For example, PE1 node 112 may process multiple RT membership NLRI's updates (add/delete) for different RTs across different services, including EVPN, and Layer 3 Virtual Private Network (L3VPN). Unless PE1 node 112 prioritizes the BGP update message advertising the ES route corresponding to the received RT membership NLRI (corresponding to ES-Import route target of ESI 1), PE1 node 112 may not generate and advertise the ES route for ESI1 in time for PE2 node 114 to receive the ES route for ESI 1 from PE1 node 112.

When PE2 node 114 does not receive the ES routes for ESI 1 from all PE nodes of ESI 1 (e.g., PE1 node 112 may advertise the ES route for ESI 1 after the timer expires), PE2 node 114 may elect the improper DF for sending BUM traffic to CE1 node 110 since PE2 node 114 does not have the complete route information of ESI 1. For example, PE2 node 114 may assume the DF role for some EVPN instances (EVIs), for which PE1 node 112 has already assumed the DF role. The resulting double DF causes duplicate packets when BUM traffic is initiated from PE3 node 116 towards CE1 node 110, since both PE1 node 112 and PE2 node 114 forward the BUM traffic, and that causes packet loops and eventual drops at CE1 node 110. Such untimely ES route advertisement wastes network resources and increase network resources usage and should be avoided.

Embodiments of this disclosure thus prioritize the RT membership handling for ES route. At reference 124, PE1 node 112 prioritizes the processing of ES route responsively to a BGP update message with the ES route advertisement 122. PE1 node 112 may process the BGP update message immediately to generate the one or more matching VPN routes without waiting on one or more periodic update timers for route update and advertisement. The timers include ones that are set for VPN route refresh or VPN route generation, or the ones configured based on the route refresh/generation. While adjusting time durations of these timers could allow a PE such as PE1 node 112 to process ES route quicker, the embodiments do not change these timers, because these timers are generic and may impact the route refresh/generation for other operations of PE1 node 112 and cause unexpected consequences. Instead, the embodiments prioritize the RT membership handling for ESI so that the one or more matching VPN routes (e.g., ES route) may be generated quickly.

Additionally, once the matching VPN routes are generated, they are included in the NLRI of a BGP update message, and the BGP update message is transmitted immediately from PE1 node 112 to PE2 node 114 at reference 126.

Thus, PE1 node 112 prioritizes the RT membership handling for ES route, and response quickly to a BGP update message advertising the ES Route matching to the received RT membership NLRI corresponding to ES-Import route target. Such a prioritization allows PE2 node 114 to receive the matching VPN routes within the timer period set to allow the reception of ES routes from other PE nodes within the same ESI. PE2 node 114 may then elect the DF node, consistent with other PE nodes within ESI 1.

Prioritization Based on ES-Import RT and/or Additional Field

In some embodiments, an additional field may be added in a RT membership NLRI to designate that RT membership NLRI needs to be prioritized. FIG. 2A illustrates route target (RT) membership Network Layer Reachability Information (NLRI) as route request with an additional field for prioritization per some embodiments. The NLRI 210 is included in a BGP update message transmitted from PE2 node 114 for RT membership NLRI advertisements in some embodiments. NLRI 210 complies with IETF RFC 4684 but with one additional flag field. Based on RFC 4684, NLRI 210 includes an "origin AS" field 212 to indicate the Autonomous System (AS) number of the VPN site that originated a route target, and a route target field 214 to indicate ES-Import route target (RT). According to IETF RFC 7432 Section 7.6, the ES-Import RT within the ES route advertisement enables all the PE nodes connected to the same multihomed site to import their Ethernet Segment routes. The ES-Import RT is carried in a transitive RT extended community with the type of hexadecimal 06 (0x 06) and the subtype of hexadecimal 02 (0x 02) as shown at references 232 and 234 in FIG. 2A, respectively. Additionally, the value of the ES-Import RT is derived automatically for the ESI by encoding the high-order 6-octet portion of the 9-octet ESI value, which corresponds to a media access control (MAC) address, in the ES-Import RT as shown at reference 236 in FIG. 2A.

Based on receiving a BGP update message including an ES-Import RT as in NLRI 210, a PE node (e.g., PE1 node 112) will prioritize the RT membership NLRI handling for the corresponding ES route by immediately processing the request to generate the matching VPN (e.g., ES routes as discussed in FIG. 1) routes immediately and advertise the matching VPN routes through a BGP update message.

Additionally or alternatively, a flag field (e.g., one octet) shown at reference 218 in FIG. 2A is included in the NLRI 210. The flag field includes a "P" flag (P being short for prioritization), which contains one or more bits, and setting the bits to a certain value (e.g., all ones/zeros or another bit pattern) indicates that the "P" flag is set and the NLRI 210 is to be prioritized. The remaining bits of the flag field may be reserved or used for other purposes (e.g., other flags for NLRI processing).

In handling of RT membership requests, RT membership NLRI with the "P" flag being set is processed immediately and its matching VPN routes (e.g., ES routes as discussed in FIG. 1) are advertised without waiting for any update timers or other pending RT membership request for VPN refresh.

The support of the "P" flag may be negotiated when a PE node is activated. For example, the support of the "P" flag may be negotiated with capabilities optional parameter in BGP open message exchange, according to IETF RFC 5492, entitled "Capabilities Advertisement with BGP-4" and dated February 2009. Once the PE nodes in a network agree, the "P" flag may be supported.

Note that the "P" flag to prioritize RT membership NLRI may be applied beyond ES route handling. For example, the "P" flag may be set for L3VPN routes. In these embodiments, the RT membership corresponds to L3VPN priority RT's Virtual Route Forwarding (VRF), and the route to be advertised is a L3VPN route for a matching RT's VRF. Accordingly, route target 214 won't include the type and subtype value of 0x 0602, but values for L3VPN Route Targets instead.

Since the "P" flag may indicate the receiving PE node to prioritize the RT membership NLRI by itself, regardless of the content of the route target 214 (the content of route target 214 are shown as dotted boxes at references 232 to 236), an operator of a network may set the "P" flag for a type of route to prioritize based on the specific need of the network. The "P" flag thus adds flexibility to handle VPN route update in some embodiments.

Note that prioritization based on ES-Import RT and the additional "P" flag can be implemented concurrently as the two approaches are not mutually exclusive. Some embodiments for ES route advertisement may implement one while others may prefer both. The additional "P" flag allows more flexibility in prioritization with the added work of capability negotiation.

Figure 2B:
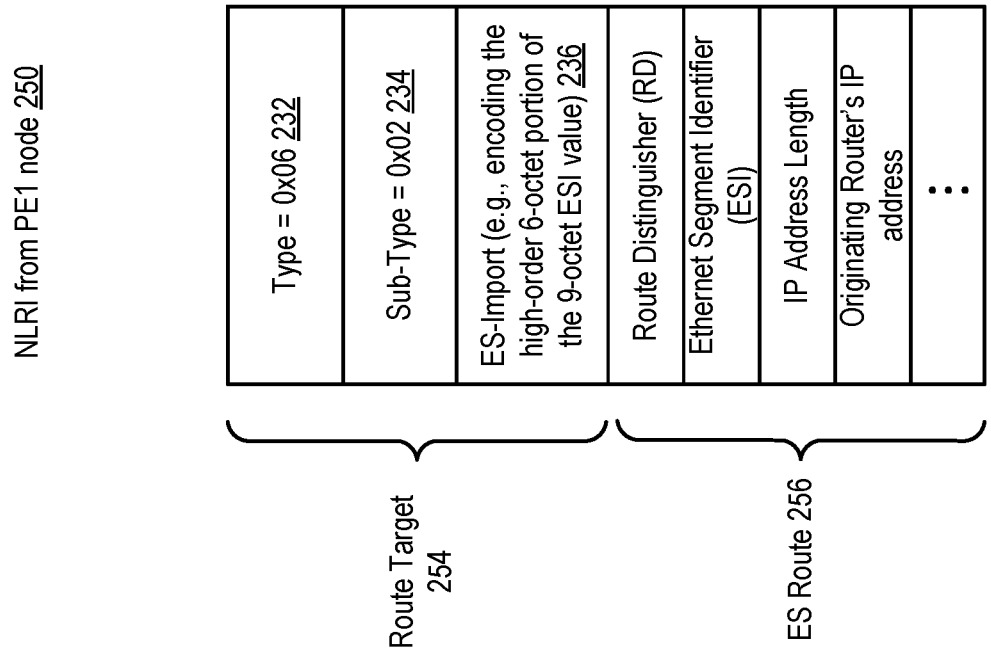
FIG. 2B illustrates Ethernet Virtual Private Network (EVPN) Network Layer Reachability Information (NLRI) as route response per some embodiments.
Figure 2A:
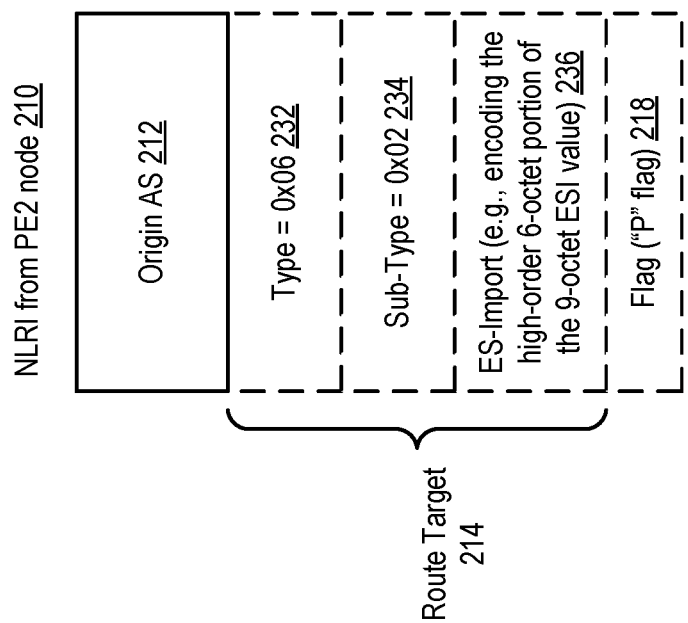
FIG. 2A illustrates route target (RT) membership Network Layer Reachability Information (NLRI) as route request with an additional field for prioritization per some embodiments.

FIG. 2B illustrates Ethernet Virtual Private Network (EVPN) Network Layer Reachability Information (NLRI) as route response per some embodiments. NLRI 250 is included in a BGP update message transmitted from PE1 node 112 responsive to the RT membership NLRI advertisements from PE2 node 114 for route request in some embodiments.

NLRI 250 includes route target 254 and an ES route 256 imported from PE1 node 112. ES route 256 within NLRI 250, according to IETF RFC 7432, includes a route distinguisher (RD) to distinguish between routes with overlapping IP prefixes within a given VPN instance, an ESI (e.g., ESI 1 in the example of FIG. 1), an IP address length field to indicate the length of the IP address associated with the endpoint of the ES, and an originating Router's IP address (e.g., the IPv4/v6 address of the sending PE node, which is PE1 node 112 in this example), and any other optional fields.

Route target 254 and ES route 256 are a part of EVPN NLRI advertisement per IETF RFC 7432.

The prioritization in either approach provides advantages over known approaches. For example, the prioritization provides expeditious DF election results during ES activation/restoration, improving convergence time. It reduces the possibility of duplicated DFs as ES routes are available faster and within the timer for the reception of ES routes, and the uniformity of DF election reduces the possibility of duplicated BUM traffic at a multihomed CE. Furthermore, the prioritization allows VPN convergence quickly with RT membership constraint.

Operations per Some Embodiments

Figure 3:
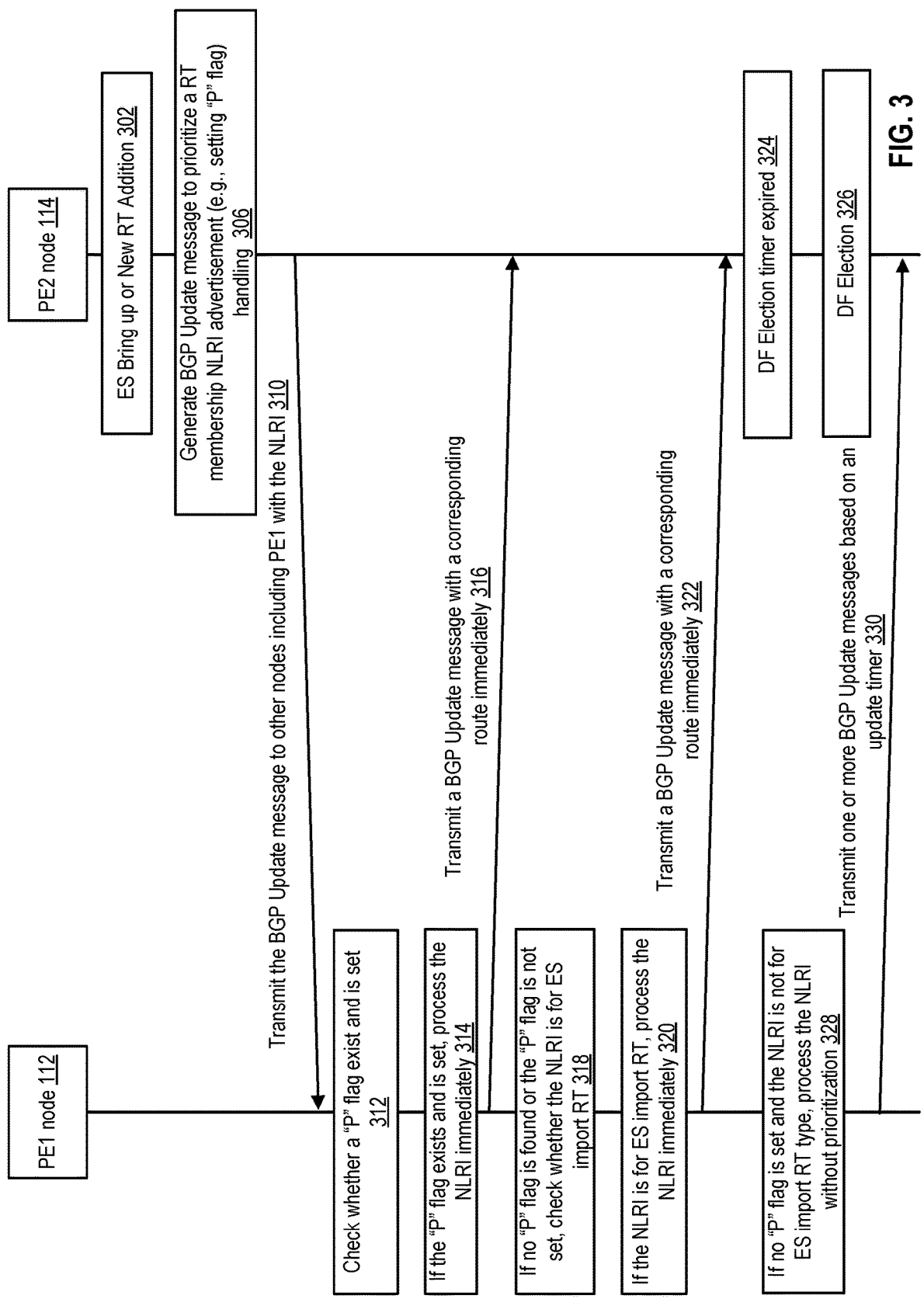
FIG. 3 illustrates the operations of prioritizing route target (RT) membership Network Layer Reachability Information (NLRI) at a pair of BGP nodes per some embodiments.

FIG. 3 illustrates the operations of prioritizing route target (RT) membership Network Layer Reachability Information (NLRI) at a pair of BGP nodes per some embodiments. The pair of BGP nodes are PE1 node 112 and PE2 node 114 discussed herein above.

At reference 302, PE2 node 114 detects an Ethernet segment (ES) bring up or a new prioritized RT addition. At reference 306, PE2 node 114 generates a BGP update message to prioritize a RT membership NLRI advertisement handling. The BGP update message includes ES-import RT in the NLRI. Additionally, the NLRI may include a "P" flag if the support of that capability is negotiated successfully between PE1 node 112 and PE2 node 114.

At reference 310, PE2 node 114 transmits the BGP update messages to other nodes including PE1 node 112 with the NLRI. PE1 node 112 checks the received NLRI to determine whether the NLRI has a "P" flag at 312; and if there is one, whether the "P" flag is set. If the "P" flag exists and is set, PE1 node 112 immediately processes the NLRI to generate the one or more matching VPN routes without waiting for one or more periodic update timers for route update and advertisement. PE1 node 112 then includes the matching VPN routes in a NLRI (e.g., NLRI 250) and transmits a BGP update message with the NLRI to PE2 node 114 at reference 316.

If the "P" flag can't be found or the "P" flag is not set, PE1 node 112 checks whether the received NLRI is for ES-Import RT at reference 318. At reference 320, if the received NLRI is for ES-Import RT, PE1 node 114 processes the NLRI immediately and transmits a BGP update message with the corresponding VPN route within a NLRI immediately at reference 322. The operations of processing NLRI and transmitting the BGP update messages at references 320 and 322 are similar to the ones at references 314 and 316, respectively.

The prioritized process of the received NLRI allows the BGP messages with the matching VPN routes to arrive at the route request node, PE2 node 114, prior to the expiration of a timer set for DF election at reference 324, the same timer to allow the reception of ES routes from other PE nodes connected to the same ES, ESI 1. With the VPN routes being received in time, the DF election at reference 326 may be performed at PE2 node 114 consistently as other nodes (e.g., PE1 node 112) at the same ES. PE1 node 112 processes non-prioritized NLRI at reference 328. The corresponding BGP update messages are then transmitted based on an update timer at reference 330.

FIG. 4 illustrates the operations of prioritizing route target (RT) membership handling at a network device that receives a BGP update message per some embodiments. The operations of the network device as shown in method 400 may be performed by a PE node such as PE1 node 112 discussed herein above.

At reference 402, upon receiving a first border gateway protocol (BGP) update message with a route target (RT) membership Network Layer Reachability Information (NLRI) that indicates a route target (RT) membership, the PE node determines whether to prioritize the first BGP update message based on existence of a flag indication within the RT membership NLRI.

At reference 404, responsive to the existence of the flag indication and the flag indication being set in the RT membership NLRI, the PE node processes the RT membership NLRI to advertise a route matching the RT membership indicated in the first BGP update message without waiting on one or more periodic update timers for route update and advertisement.

At reference 406, responsive to the existence of the flag indication and the flag indication not being set but the RT membership NLRI including a combination of type and subtype that indicates an ES-import RT, the PE node processes the RT membership NLRI to advertise the route matching the RT membership indicated in the first BGP update message without waiting on the one or more periodic update timers. At reference 408, when the flag indication does not exist and the RT membership NLRI does not include a combination of type and subtype that indicates an ES-import RT (that is, neither of checks at 404 nor 406 turned out affirmative), the PE node then processes the RT membership NLRI to advertise upon expiration of the one or more periodic update timers.

In some embodiments, processing the RT membership NLRI comprises generating the route matching the RT membership indicated in the first BGP update message prior to generating another route for another BGP update message without the flag indication be set or the combination of type and subtype that indicates the ES-import RT.

In some embodiments, the first BGP update message is received by a first network device from a second network device, wherein the second network device sets the flag indication within the RT membership NLRI for prioritizing the RT membership processing by first network device.

In some embodiments, the one or more periodic update timers comprise a timer for a virtual private network refresh.

In some embodiments, the RT membership corresponds to an Ethernet Segment Identifier (ESI), and wherein the route to be advertised is an Ethernet Virtual Private Network (EVPN) ES route for the ESI.

In some embodiments, the first BGP update message is received by a first network device from a second network device, wherein advertisement of the EVPN ES route for the ESI is transmitted to the second network device through a second BGP update message.

In some embodiments, both first and second network devices are to build their respective provider edge (PE) list to select a dedicated forwarder (DF) for the Ethernet Segment corresponding to the ESI.

In some embodiments, the combination of type and subtype indicates the ES-import RT by a combination value of hexadecimal 06 02.

In some embodiments, the RT membership corresponds to Layer 3 Virtual Private Network (L3VPN) Priority RT's Virtual Route Forwarding (VRF), and wherein the route to be advertised is an L3VPN route for a matching RT's VRF.

In some embodiments, the first update BGP update message is received by a first network device from a second network device, and the first network and second network devices negotiate and agree on capability support of the flag indication (e.g., in RT membership NLRI) first through BGP open messages prior to the second network device transmitting the first update BGP update message with the flag indication.

FIG. 5 illustrates the operations of prioritizing route target (RT) membership handling at a network device that transmits a BGP update message per some embodiments. The operations of the network device as shown in method 500 may be performed by a PE node such as PE2 node 114 discussed herein above.

At reference 502, upon detecting activation of an Ethernet segment (ES) at a first network device, the first network device generates a border gateway protocol (BGP) update message to include a route target (RT) membership Network Layer Reachability Information (NLRI) that indicates a RT membership.

At reference 504, responsive to a successful negotiation between the first network device and a second network device to support of a flag indication to prioritize the BGP update message at the second network device, the first network device sets the flag indication within the RT membership NLRI.

At reference 506, the first network device sets a combination of type and subtype that indicates an ES-import RT within the RT membership NLRI in case of EVPN. At reference 508, the first network device transmits the BGP update message including the RT membership NLRI from the first network device to one or more receiving network devices in the network including the second network device.

Note that the operations at the first network device are the ones mirroring that of the second network device relating to FIG. 4. The embodiments discussed relating to FIG. 4 thus are applicable to FIG. 5 as well.

Devices and Environments for Implementing Embodiments of the Invention

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 6A:
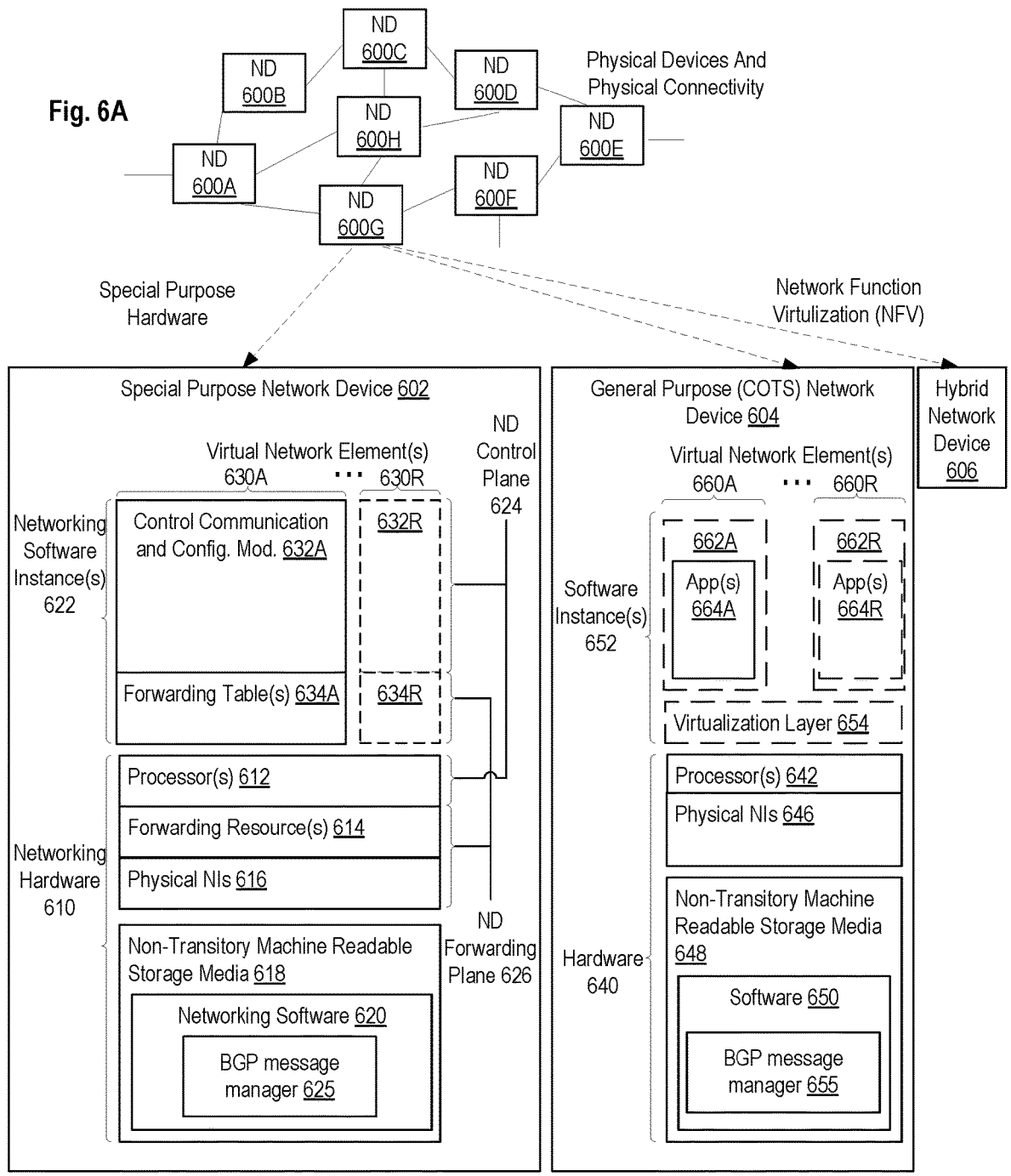
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a special-purpose operating system (OS); and 2) a general-purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). In some embodiments, networking software 620 includes a BGP message manager 625 that implements operations to generate, transmit, receive, and process the BGP update messages discussed herein relating to FIGS. 1 to 5 to prioritize route target membership handling.

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
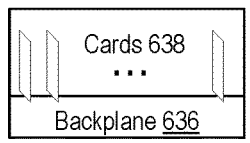
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general-purpose network device 604 includes hardware 640 comprising a set of one or more processor(s) 642 (which are often COTS processors) and physical NIs 646, as well as non-transitory machine-readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers). In some embodiments, networking software 650 includes a BGP message manager 655 that implements operations to generate, transmit, receive, and process the BGP update messages discussed herein relating to FIGS. 1 to 5.

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
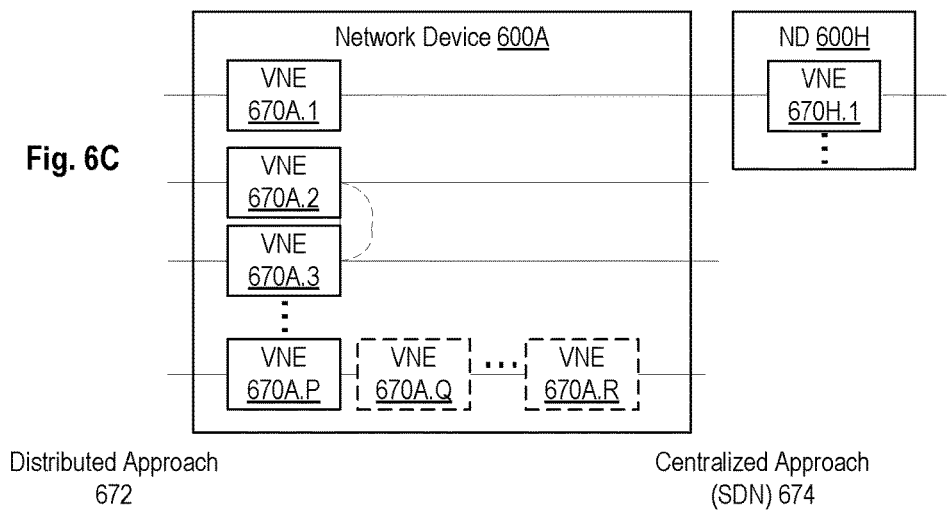
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general-purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 6D:
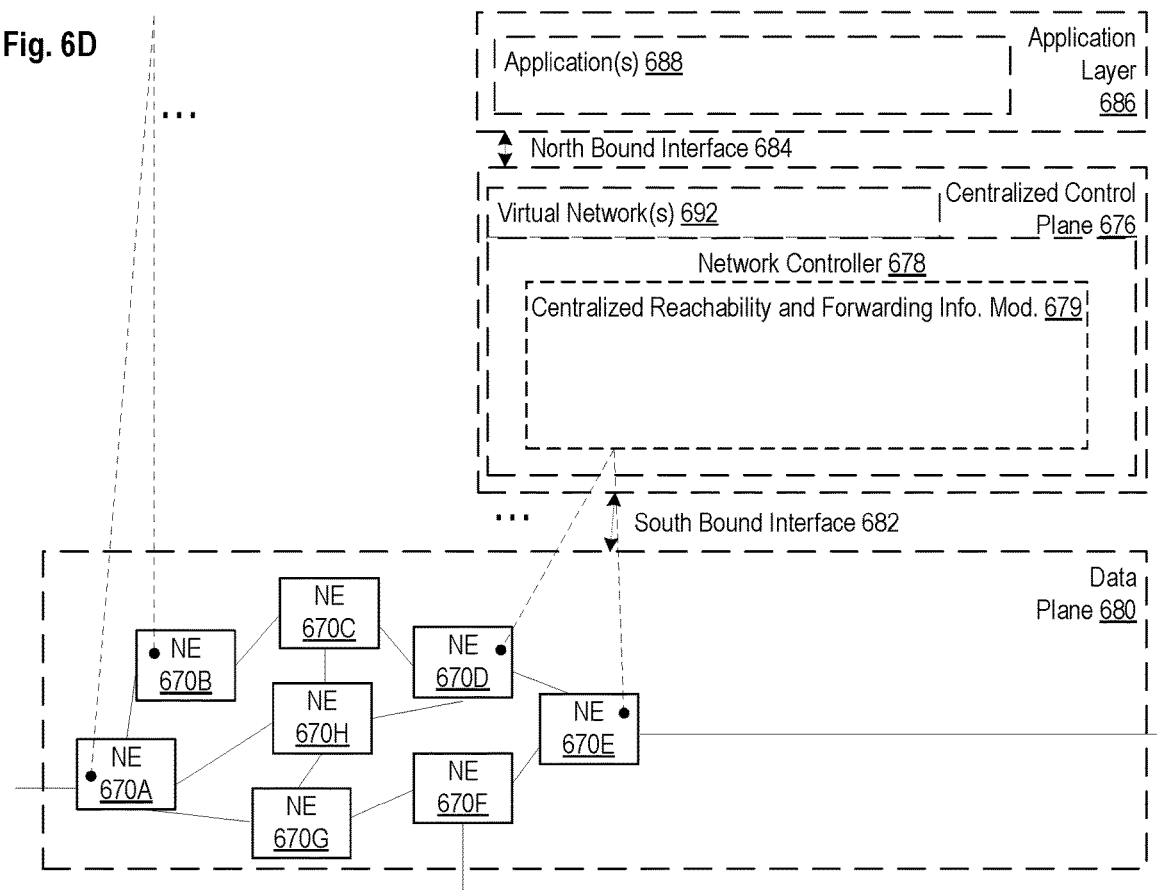
FIG. 6D illustrates a network with a single network element (NE) on each of the NDs, and within this straightforward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straightforward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general-purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, network nodes or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information-albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general-purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information-albeit less so than in the case of a distributed approach) and the hybrid network device 606. In fact, the use of SDN techniques can enhance the NFV techniques typically used in the general-purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1)

embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674 but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
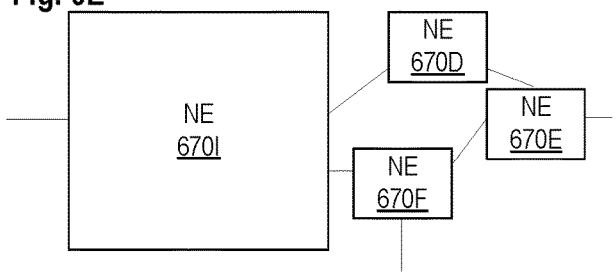
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
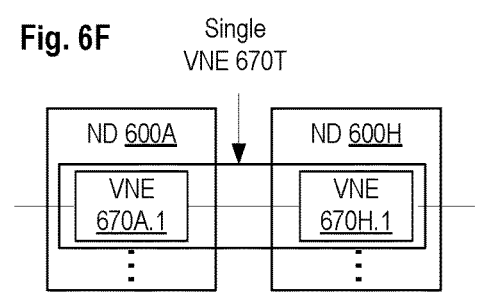
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

A Wireless Network Per Some Embodiments

Figure 7:
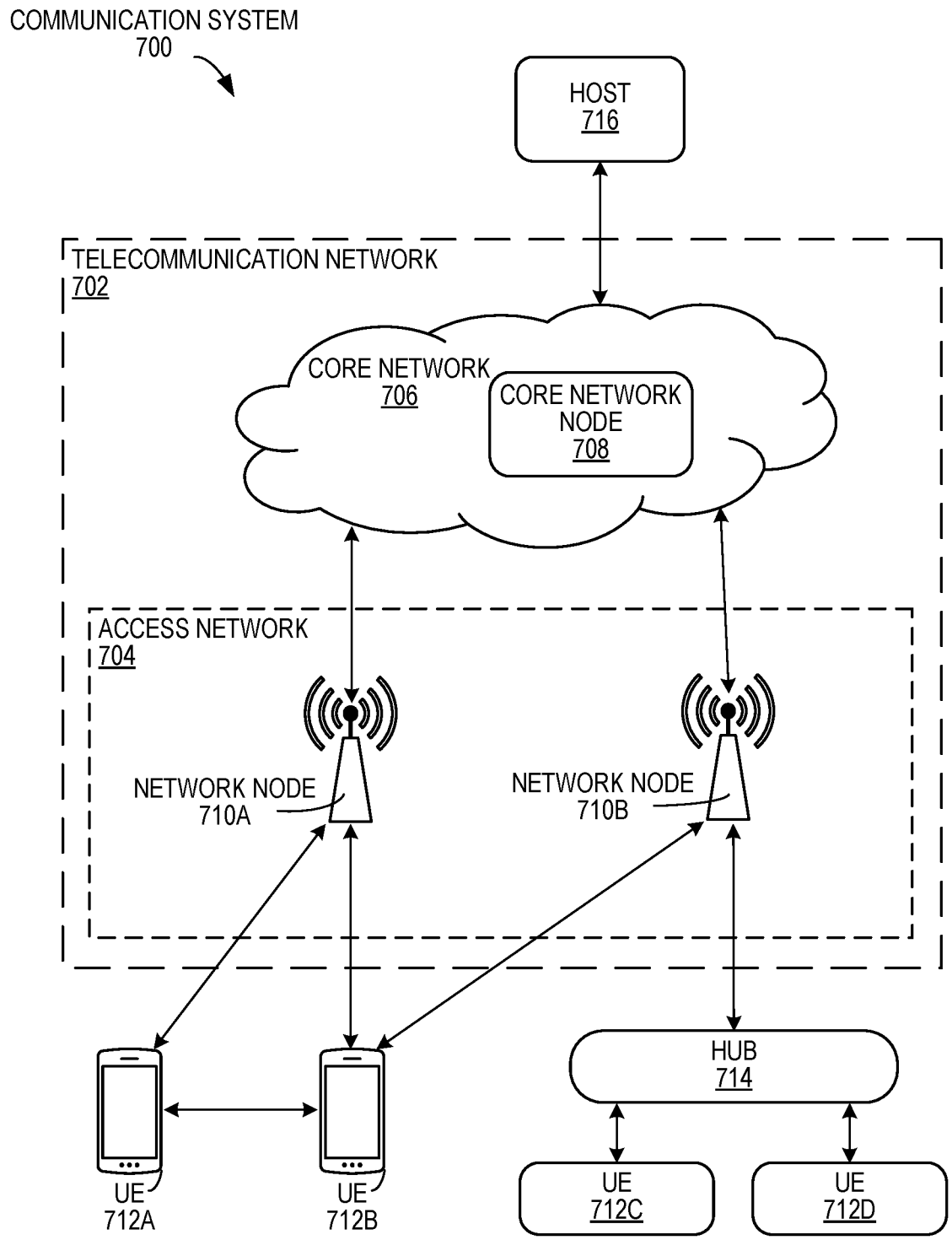
FIG. 7 illustrates an example of a communication system per embodiments.

FIG. 7 illustrates an example of a communication system 700 per some embodiments. In the example, the communication system 700 includes a telecommunication network 702 that includes an access network 704, such as a radio access network (RAN), and a core network 706, which includes one or more core network nodes 708. The access network 704 includes one or more access network nodes, such as network nodes 710A and 710B (one or more of which may be generally referred to as network nodes 710), or any other similar 3rd Generation Partnership Project (3GPP) access nodes or non-3GPP access points. Moreover, as will be appreciated by those of skill in the art, a network node is not necessarily limited to an implementation in which a radio portion and a baseband portion are supplied and integrated by a single vendor. Thus, it will be understood that network nodes include disaggregated implementations or portions thereof. For example, in some embodiments, the telecommunication network 702 includes one or more Open-RAN (ORAN) network nodes. An ORAN network node is a node in the telecommunication network 702 that supports an ORAN specification (e.g., a specification published by the O-RAN Alliance, or any similar organization) and may operate alone or together with other nodes to implement one or more functionalities of any node in the telecommunication network 702, including one or more network nodes 710 and/or core network nodes 708. Each network node may be one of network element 670A-670E shown in FIG. 6D.

Examples of an ORAN network node include an open radio unit (O-RU), an open distributed unit (O-DU), an open central unit (O-CU), including an O-CU control plane (O-CU-CP) or an O-CU user plane (O-CU-UP), a RAN intelligent controller (near-real time or non-real time) hosting software or software plug-ins, such as a near-real time control application (e.g., xApp) or a non-real time control application (e.g., rApp), or any combination thereof (the adjective "open" designating support of an ORAN specification). The network node may support a specification by, for example, supporting an interface defined by the ORAN specification, such as an A1, F1, W1, E1, E2, X2, Xn interface, an open fronthaul user plane interface, or an open fronthaul management plane interface. Moreover, an ORAN access node may be a logical node in a physical node. Furthermore, an ORAN network node may be implemented in a virtualization environment (described further below) in which one or more network functions are virtualized. For example, the virtualization environment may include an O-Cloud computing platform orchestrated by a Service Management and Orchestration Framework via an O-2 interface defined by the O-RAN Alliance or comparable technologies. The network nodes 710 facilitate direct or indirect connection of user equipment (UE), such as by connecting UEs 712A, 712B, 712C, and 712D (one or more of which may be generally referred to as UEs 712) to the core network 706 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 700 may include any number of wired or wireless networks, network nodes, UEs, and/or any other components or systems that may facilitate or participate in the communication of data and/or signals whether via wired or wireless connections. The communication system 700 may include and/or interface with any type of communication, telecommunication, data, cellular, radio network, and/or other similar type of system.

The UEs 712 may be any of a wide variety of communication devices, including wireless devices arranged, configured, and/or operable to communicate wirelessly with the network nodes 710 and other communication devices. Similarly, the network nodes 710 are arranged, capable, configured, and/or operable to communicate directly or indirectly with the UEs 712 and/or with other network nodes or equipment in the telecommunication network 702 to enable and/or provide network access, such as wireless network access, and/or to perform other functions, such as administration in the telecommunication network 702.

In the depicted example, the core network 706 connects the network nodes 710 to one or more hosts, such as host 716. These connections may be direct or indirect via one or more intermediary networks or devices. In other examples, network nodes may be directly coupled to hosts. The core network 706 includes one more core network nodes (e.g., core network node 708) that are structured with hardware and software components. Features of these components may be substantially similar to those described with respect to the UEs, network nodes, and/or hosts, such that the descriptions thereof are generally applicable to the corresponding components of the core network node 708. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 716 may be under the ownership or control of a service provider other than an operator or provider of the access network 704 and/or the telecommunication network 702, and may be operated by the service provider or on behalf of the service provider. The host 716 may host a variety of applications to provide one or more services. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 700 of FIG. 7 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 702 is a cellular network that implements 3GPP standardized features. Accordingly, the telecommunication network 702 may support network slicing to provide different logical networks to different devices that are connected to the telecommunication network 702. For example, the telecommunication network 702 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 712 are configured to transmit and/or receive information without direct human interaction. For instance, a UE may be designed to transmit information to the access network 704 on a predetermined schedule, when triggered by an internal or external event, or in response to requests from the access network 704. Additionally, a UE may be configured for operating in single- or multiple radio access technology (multi-RAT) or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 714 communicates with the access network 704 to facilitate indirect communication between one or more UEs (e.g., UE 712C and/or 712D) and network nodes (e.g., network node 710B). In some examples, the hub 714 may be a controller, router, content source and analytics, or any of the other communication devices described herein regarding UEs. For example, the hub 714 may be a broadband router enabling access to the core network 706 for the UEs. As another example, the hub 714 may be a controller that sends commands or instructions to one or more actuators in the UEs. Commands or instructions may be received from the UEs, network nodes 710, or by executable code, script, process, or other instructions in the hub 714. As another example, the hub 714 may be a data collector that acts as temporary storage for UE data and, in some embodiments, may perform analysis or other processing of the data. As another example, the hub 714 may be a content source. For example, for a UE that is a virtual reality (VR) headset, display, loudspeaker or other media delivery device, the hub 714 may retrieve VR assets, video, audio, or other media or data related to sensory information via a network node, which the hub 714 then provides to the UE either directly, after performing local processing, and/or after adding additional local content. In still another example, the hub 714 acts as a proxy server or orchestrator for the UEs, in particular if one or more of the UEs are low energy IoT devices.

The hub 714 may have a constant/persistent or intermittent connection to the network node 710b. The hub 714 may also allow for a different communication scheme and/or schedule between the hub 714 and UEs (e.g., UE 712C and/or 712D), and between the hub 714 and the core network 706. In other examples, the hub 714 is connected to the core network 706 and/or one or more UEs via a wired connection. Moreover, the hub 714 may be configured to connect to a machine-to-machine (M2M) service provider over the access network 704 and/or to another UE over a direct connection. In some scenarios, UEs may establish a wireless connection with the network nodes 710 while still connected via the hub 714 via a wired or wireless connection. In some embodiments, the hub 714 may be a dedicated hub—that is, a hub whose primary function is to route communications to/from the UEs from/to the network node 710B. In other embodiments, the hub 714 may be a non-dedicated hub—that is, a device which is capable of operating to route communications between the UEs and network node 710B, but which is additionally capable of operating as a communication start and/or end point for certain data channels. In some embodiments, the network devices 602, 604, or 606 may implement network nodes 708, 710A-B, or host 717, which then performs operations discussed herein above relating to FIGS. 1 to 5.

Terms

An electronic device stores and transmits (internally and/or with other electronic devices over a network) code (which is composed of software instructions and which is sometimes referred to as a computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other form of propagated signals-such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radio frequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to an NIC. One or more parts of an embodiment of the invention may be implemented using different combinations of software, firmware, and/or hardware.

The terms "module," "logic," and "unit" used in the present application, may refer to a circuit for performing the function specified. In some embodiments, the function specified may be performed by a circuit in combination with software such as by software executed by a general-purpose processor.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A method to prioritize route target membership handling in a network, comprising:
    upon receiving a first border gateway protocol (BGP) update message with a route target (RT) membership Network Layer Reachability Information (NLRI) that indicates a route target (RT) membership, determining whether to prioritize the first BGP update message based on existence of a flag indication within the RT membership NLRI;
    responsive to the existence of the flag indication and the flag indication being set in the RT membership NLRI, processing the RT membership NLRI to advertise a route matching the RT membership indicated in the first BGP update message without waiting on one or more periodic update timers for route update and advertisement;
    responsive to the existence of the flag indication and the flag indication not being set but the RT membership NLRI including a combination of type and subtype that indicates an ES-import RT, processing the RT membership NLRI to advertise the route matching the RT membership indicated in the first BGP update message without waiting on the one or more periodic update timers; and
    otherwise processing the RT membership NLRI to advertise upon expiration of the one or more periodic update timers.

2. The method of claim 1, wherein processing the RT membership NLRI comprises generating the route matching the RT membership indicated in the first BGP update message prior to generating another route for another BGP update message without the flag indication be set or the combination of type and subtype that indicates the ES-import RT.

3. The method of claim 1, wherein the first BGP update message is received by a first network device from a second network device, wherein the second network device sets the flag indication within the RT membership NLRI for prioritizing the RT membership processing by the first network device.

4. The method of claim 1, wherein the one or more periodic update timers comprise a timer for a virtual private network refresh.

5. The method of claim 1, wherein the RT membership corresponds to an Ethernet Segment Identifier (ESI), and wherein the route to be advertised is an Ethernet Virtual Private Network (EVPN) ES route for the ESI.

6. The method of claim 5, wherein the first BGP update message is received by a first network device from a second network device, wherein advertisement of the EVPN ES route for the ESI is transmitted to the second network device through a second BGP update message.

7. The method of claim 6, wherein both the first and second network devices are to build respective provider edge (PE) lists to select a dedicated forwarder (DF) for the Ethernet Segment corresponding to the ESI.

8. The method of claim 1, wherein the combination of type and subtype indicates the ES-import RT by a combination value of hexadecimal 06 02.

9. The method of claim 1, wherein the RT membership corresponds to Layer 3 Virtual Private Network (L3VPN) Priority RT's Virtual Route Forwarding (VRF), and wherein the route to be advertised is an L3VPN route for a matching RT's VRF.

10. The method of claim 1, wherein the first BGP update message is received by a first network device from a second network device, and the first network and second network devices negotiate and agree on capability support of the flag indication first through BGP open messages prior to the second network device transmitting the first update BGP update message with the flag indication.

11. A network device to operate as a border gateway protocol (BGP) node, comprising:
  a processor and non-transitory machine-readable storage medium that provides instructions that, when executed by the processor, cause the processor to perform:
  upon receiving a first border gateway protocol (BGP) update message with a route target (RT) membership Network Layer Reachability Information (NLRI) that indicates a route target (RT) membership, determining whether to prioritize the first BGP update message based on existence of a flag indication within the RT membership NLRI;
  responsive to the existence of the flag indication and the flag indication being set in the RT membership NLRI, processing the RT membership NLRI to advertise a route matching the RT membership indicated in the first BGP update message without waiting on one or more periodic update timers for route update and advertisement;
  responsive to the existence of the flag indication and the flag indication not being set but the RT membership NLRI including a combination of type and subtype that indicates an ES-import RT, processing the RT membership NLRI to advertise the route matching the RT membership indicated in the first BGP update message without waiting on the one or more periodic update timers; and
  otherwise processing the RT membership NLRI to advertise upon expiration of the one or more periodic update timers.

12. The network device of claim 11, wherein processing the RT membership NLRI comprises generating the route matching the RT membership indicated in the first BGP update message prior to generating another route for another BGP update message without the flag indication be set or the combination of type and subtype that indicates the ES-import RT.

13. The network device of claim 11, wherein the first BGP update message is received by a first network device from a second network device, wherein the second network device sets the flag indication within the RT membership NLRI for prioritizing the RT membership processing by the first network device.

14. The network device of claim 11, wherein the RT membership corresponds to an Ethernet Segment Identifier (ESI), and wherein the route to be advertised is an Ethernet Virtual Private Network (EVPN) ES route for the ESI.

15. The network device of claim 11, wherein the RT membership corresponds to Layer 3 Virtual Private Network (L3VPN) Priority RT's Virtual Route Forwarding (VRF), and wherein the route to be advertised is an L3VPN route for a matching RT's VRF.

16. A non-transitory machine-readable storage medium that provides instructions that, when executed by a processor, cause the processor to perform:
  upon receiving a first border gateway protocol (BGP) update message with a route target (RT) membership Network Layer Reachability Information (NLRI) that indicates a route target (RT) membership, determining whether to prioritize the first BGP update message based on existence of a flag indication within the RT membership NLRI;
  responsive to the existence of the flag indication and the flag indication being set in the RT membership NLRI, processing the RT membership NLRI to advertise a route matching the RT membership indicated in the first BGP update message without waiting on one or more periodic update timers for route update and advertisement;
  responsive to the existence of the flag indication and the flag indication not being set but the RT membership NLRI including a combination of type and subtype that indicates an ES-import RT, processing the RT membership NLRI to advertise the route matching the RT membership indicated in the first BGP update message without waiting on the one or more periodic update timers; and
  otherwise processing the RT membership NLRI to advertise upon expiration of the one or more periodic update timers.

17. The non-transitory machine-readable storage medium of claim 16, wherein the one or more periodic update timers comprise a timer for a virtual private network refresh.

18. The non-transitory machine-readable storage medium of claim 16, wherein the RT membership corresponds to an Ethernet Segment Identifier (ESI), and wherein the route to be advertised is an Ethernet Virtual Private Network (EVPN) ES route for the ESI.

19. The non-transitory machine-readable storage medium of claim 16, wherein the RT membership corresponds to Layer 3 Virtual Private Network (L3VPN) Priority RT's Virtual Route Forwarding (VRF), and wherein the route to be advertised is an L3VPN route for a matching RT's VRF.

20. The non-transitory machine-readable storage medium of claim 16, wherein the first BGP update message is received by a first network device from a second network device, and the first network and second network devices negotiate and agree on capability support of the flag indication first through BGP open messages prior to the second network device transmitting the first update BGP update message with the flag indication.

\* \* \* \* \*